Patented May 9, 1933

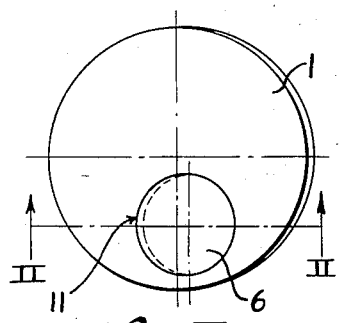
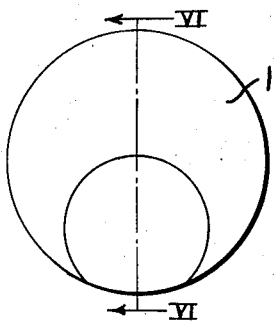
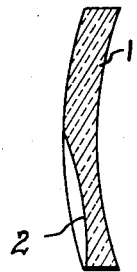
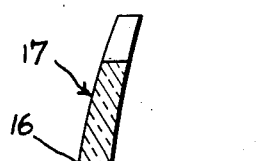
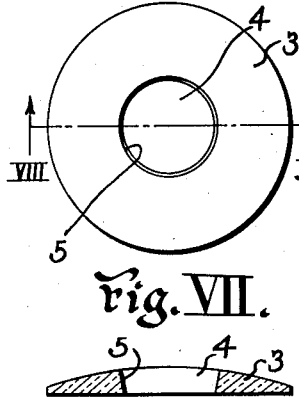
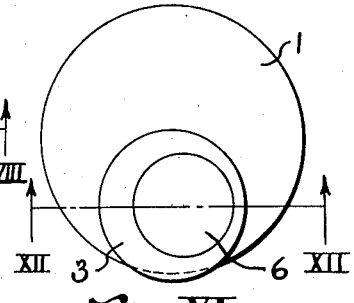
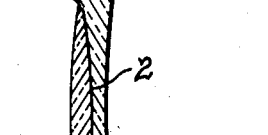
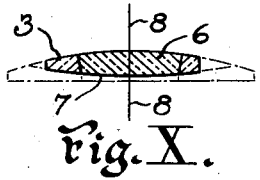
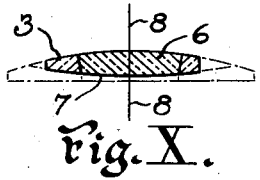
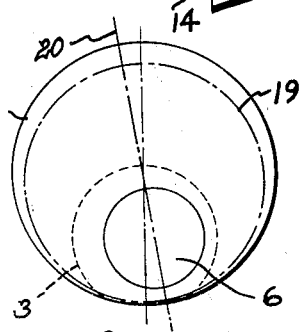
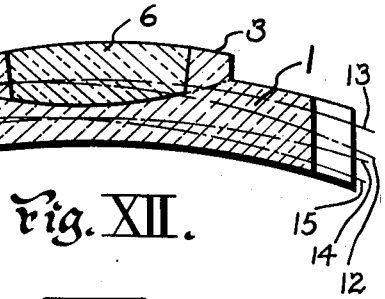
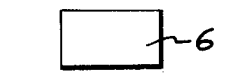

1,907,810

UNITED STATES PATENT OFFICE

HARRY W. HILL, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS

OPHTHALMIC LENS

Application filed November 22, 1930. Serial No. 497,460.

This invention relates to improvements in ophthalmic lenses and has particular reference to an improved bifocal or multifocal lens and the process of making the same.

One of the principal objects of the invention is to provide an improved segment for such a lens embodying a prism correction therein and improved means of making the same.

Other objects of the invention are to provide improved means for controlling the size and shape of the segment, and for controlling the optical center and position of the dividing line of the segment.

Another object of the invention is to provide improved means for controlling the amount of prism correction in the segment and for controlling the position of said prism correction therein.

Another object of the invention is to provide improved means of controlling the size, shape, dispersion and optical center of the reading or inserted segment of a fused bifocal or multifocal lens and has particular reference to an improved process of making the same, whereby the grinding and polishing operations usual in the production of lenses of this character are greatly reduced in number and the ultimate cost of the lens also greatly reduced.

Another object of the invention is to provide improved means and an improved process for making a fused bifocal or multifocal lens having a composite countersink button of glass of a plurality of different indices of refraction whereby the difficult and commercially impracticable operation of fusing the edge between the parts of said button is overcome and made commercially and economically possible.

Another object of the invention is to provide an improved process of forming a bifocal or multifocal lens having odd shaped reading additions, particularly those of an irregular contour.

Another object of the invention is to provide improved means and processes wherein the position of the optical center of the reading segment with respect to the optical center of the distance portion of a fused bifocal or multifocal lens can be definitely controlled.

Another object is to provide a reading segment in a fused bifocal or multifocal lens that will be of such size and shape as to be best suited to vocational or other individual uses of the wearer.

Another object is to provide improved means and processes whereby the position of the dividing line between the reading and distance fields of such lenses can be controlled with respect to the optical centers of said fields.

Another object is to provide improved means and processes whereby the position of the optical center of the reading field with respect to the optical center of the distance field can be definitely controlled.

Another object of the invention is to provide improved means and processes of controlling the size of odd shaped segments or reading additions.

Another object is to provide simple, efficient and economical means for producing bifocal or multifocal lenses having incorporated therein a plurality of advantageous features which have hitherto been difficult to obtain in lenses of this character.

Other objects and advantages of this invention will become apparent from the following description taken in connection with the accompanying drawing and it will be understood that many changes may be made in the details of construction, arrangement of parts and steps of the process without departing from the spirit of the invention as expressed in the accompanying claims. I, therefore, do not wish to be limited to the exact details of construction and steps of the process shown and described as the preferred forms only have been shown by way of illustration.

Referring to the drawing:

Fig. I is a perspective view of a finished lens embodying the invention;

Fig. II is a section on line II—II of Fig. I, showing the segment in the convex side of the lens;

Fig. III is a view similar to Fig. II showing the segment on the concave side of the lens;

Fig. IV is an enlarged sectional view similar to Fig. II;

Fig. V is a front elevation of the major blank showing a step in the process;

Fig. VI is a section on line VI—VI of Fig. V showing the countersink;

Fig. VII is a front elevation of the button showing the recess therethrough;

Fig. VIII is a section on line VIII—VIII of Fig. VII;

Fig. IX is a view similar to Fig. VIII showing the segment in the recess in the button;

Fig. X is a view similar to Fig. IX illustrating the shaping of the button;

Fig. XI is a front elevation of the lens blank showing the button in place therein;

Fig. XII is an enlarged section on line XII—XII of Fig. XI illustrating the method of finishing the lens;

Fig. XIII is a diagrammatic view illustrating how the lens is cut from the finished blank; and Fig. XIV is a front elevation of a modified form of segment.

In the past it has been a difficult and expensive matter to incorporate a prism correction in the segment of a bifocal or multifocal lens embodying the necessity of grinding and polishing a spherical recess in a body of glass on an eccentric axis. Besides being difficult and expensive it was almost impracticable to regulate and control the amount and positions of the required prism correction. The above is true in the case of regular circular shaped segments. In the case of irregular shaped segments it would be practically impossible to make such recesses.

It has also been found from past experience that a fused bifocal or multifocal lens having a circular reading segment is not as efficient in many instances as some other special shape. It has, however, been considered impracticable if not commercially impossible to make many of these desired shapes in fused form, which shapes have been found desirable from experience with segments of the cemented form.

It has also been found from experience that where the countersink button of a fused bifocal or multifocal lens is made in composite form from a plurality of pieces of glass of different index of refraction that it has been most difficult if not commercially impracticable to fuse the edge between the sections of said composite button.

The prime objects, therefore, of the invention is to provide simple, efficient and economical means whereby a fused bifocal or multifocal lens having such a segment can be made for commercial use and in which is incorporated many advantages hitherto unobtainable in prior art lenses of this character both from a standpoint of the cost and practicability of production and of the optical excellence and appearance of the finished article.

Referring to the drawing in which similar reference characters denote corresponding parts throughout a major lens blank 1 of crown or similar glass of a low index of refraction has the countersink curve 2 therein. This curve is of the required radius to produce the desired power of the reading segment. This blank is like the prior art blank for making fused bifocal or multifocal lenses. The countersink button 3 is made of glass of sensibly the same index of refraction as the major blank 1. The recess 4, see Figs. VII and VIII, is made therethrough. The edges 5 of the recess are preferably slightly tapered as shown in Fig. VIII. This taper aids in the fusing of the segment, to be described later, into the recess, allowing the same to fuse all around and to drop down as it is fused. It gives a good adhesion all the way around the segment and prevents air bubbles and like defects. If desired the edges of the recess may be made untapered. The segment 6 is made of a glass of high index of refraction such as flint, barium crown etc. It is of a different index of refraction from the button 3. This segment is fused into the recess 4 of the button 3. The underside 7 of the button 3 with the segment 6 secured therein is shaped to fit the countersink curve 2 in the major blank. The curve 7 is made axial on the center line 8—8 see Fig. X. The composite button 3 plus 6 is cut to required contour shape to fit in the countersink 2 with the curve 7 engaging the countersink surface and then fused or otherwise secured therein.

It is apparent that the button 3 which is sensibly of the same index of refraction as the major portion 1 will blend therewith and disappear leaving only the segment 6 visible.

The size of the countersink 2 is such as to accommodate the size of the segment 6 that is employed. It can be positioned on the major blank as desired.

The term prism in the segment simply means that the segment instead of being symmetrical is of a wedge shape. In Fig. IV it will be noted that the segment at the edge 11 is thicker than at the edge 16. The segment then has a prism with base down or base at 11. The effect of a prism optically is to bend the rays of light toward the base or thicker portion of the prism. It is clear that if the segment is provided with thickness at its edges as shown in Fig. IX, there is provided sufficient material to grind off the segment in an angular direction so that it is thicker on one edge than the other. The amount of prism is dependent on the difference in thickness of the edges and the prism may be positioned by placing the thick edge as desired with respect to the rest of the lens. By referring to Fig. IV it will be noted that the relative thickness of the points 11 and 16 can be controlled by means of the angular relation to the lens of the surface 17.

The position of the base or thick edge 11 of the prism in the button 3 and the direction of the displacement of light is controlled by turning the composite button in the countersink 2 before fusing. The direction of displacement of light being in the direction of the base or thick edge 11. The said base or thick edge 11 may be positioned to the left of the vertical meridian of the lens as shown in Fig. I, to the right of the vertical meridian, at the top of the segment, at the bottom or any desired position. The amount of prism correction is controlled by selecting the geometrical center about which the outline of the composite button is cut. It is apparent that the segment 6 may be formed with a thick edge all around if desired. The thickest edge being the base of the prism as shown at 11 in Fig. IV. It is apparent that the said segment may also be formed with a knife edge at 16 on the side opposite the thick edge or base 11 if desired. The thickness of the edge of the segment being controlled by the amount which is removed from the segment side of the blank when the lens is being finished.

The segment side of the lens is finished to required optical surface 17 as shown by the dot and dash lines in Fig. XII. The position of the optical center of the segment 6 may be varied or located where desired after the composite button and segment has been fused within the countersink 2 by grinding the optical surface at an angle to the countersink surface 2 as shown by the dot and dash lines 12 and 13. It is apparent that the center or axis of the segment 6 will be nearer the edge of the segment if formed at the angle shown by the line 12 and nearer the geometrical center of the segment if formed at the angle shown by the line 13. By the proper selection of the angle at which the optical surface is formed it is apparent that the optical center of the segment 6 may be placed where desired. The prescription surface indicated by the dot and dash line 14 or 15 is placed on the other side of the blank to form the finished lens.

Any desired combinations of optical glass known to the prior art for use in the production of lenses of this character may be used such as crown glass of low index of refraction for the major blank and the button and glass of high index of refraction such as flint or barium crown for the segment. Where barium crown glass is used for the segment, a crown glass of substantially the same dispersion is used for the button and major blank to reduce color aberrations. While this specification has been primarily based on a circular segment, it is clear that the recess 4 in the button need not only be circular as shown as it can be formed to any desired outline, such as square as shown in Fig. XIV, octagon, semicircular and combinations of irregular and curved contours etc, with segments therein of the same shape as the recess. It is also clear that as the recess 4 goes through the button the size of the segment is always the same until its edges have been ground away—hence the size and shape of the segment is under control and is not indefinite. The positions of the optical center of the segment may be placed in any desired relation to the center of the major blank by varying the position of the countersink 2 as well as the position of the dividing line of the segment. The optical center of the segment may be above, on, or below the dividing line and may be on or off to one side of the vertical meridian of the segment.

Trifocal and other multifocal lenses may be made by the proper selection of glasses of different indices of refraction and different colored glass may be used to obtain desired results.

The recess 4 in the button 3 may be pressed therein while the glass is plastic under heat. It may be molded or cut and if desired the edges may be ground and polished, etc. The segment 6 may also be molded while plastic or it may be cut, and if desired its edges may be ground and polished etc.

The segment may be loosely placed in the recess of the countersink button and fused or it may be placed in the recess under pressure if necessary. The segment may also be made by taking a strip or gob of glass and placing it over the recess while the button is still in the mold and at high temperature, the strip or gob also being in plastic condition, and forcing a portion thereof into the recess by a suitable plunger. It is clear that the reverse of these operations may also be used. When the segment is placed loosely in the recess proper clearance between the edges of the segment and button must be provided.

It is apparent that the size and shape of the reading segment can be controlled during the forming of the recess 4 and the segment 6, it being simply necessary to employ different shaped molding dies and different shaped segments 6 to fit the recesses 4 formed by said dies. It is to be understood that any variation in the sizes and shapes of the segments may be made.

It is clear that any desired combination with known glasses can be made keeping in mind the index of refraction for optical considerations, the dispersion for color considerations, the melting temperatures for fusing considerations and the coefficient of expansion for fusing considerations. These combinations being well known and employed in the prior art.

As shown in Fig. XIII, after the optical surfaces have been formed on the lens and the base 11 of the prism has been placed in its desired position on the major portion 1 the lens is cut along the dot and dash line 19 and finished by grinding or other methods to a beveled, flat or other shaped edge as desired. The vertical meridian of the finished lens being along the line 20.

From the foregoing description it will be seen that applicant has provided simple, efficient and economical means of obtaining a lens wherein the size, shape and position of the optical center of the reading segment and the amount and position of prism correction on said segment may be definitely controlled without introducing serious disadvantages and difficulties in obtaining a finished lens of a high standard and has particular reference to an improved process of making same. It will further be clear that the cost of production has been reduced by using a molding or heat process for certain operations instead of the more expensive grinding and polishing operations of the prior art and that the difficulty of fusing the abutting edges of composite buttons has been avoided thus making it possible to make a lens of less price with optical qualities superior to those of the prior art.

Having described my invention I claim:

1. A composite blank for the countersink button of a fused bifocal or multifocal lens comprising a piece of glass of one index of refraction having a tapered recess extending therethrough of the size and shape of the reading segment of the lens and a reading segment of glass of a different index of refraction secured in said tapered recess.

2. A blank for a fused bifocal or multifocal lens comprising a major portion of glass of one index of refraction having a countersink therein and a button fused in said countersink, said button having a tapered recess therein the contour shape of which departs from a true circle and a segment of glass of substantially the same contour shape as the recess and of a different index of refraction secured in said recess.

3. The process of forming a blank for a countersink button for a fused bifocal or multifocal lens comprising forming a tapered recess in a piece of glass of one index of refraction and securing a piece of glass of a different refractive index in the recess.

4. The process of forming a blank for a fused bifocal or multifocal lens comprising forming a countersink in a major portion of glass of one index of refraction, forming a tapered recess through a minor portion of glass of sensibly the same index of refraction as the major portion, securing a segment of glass of a different refractive index in the tapered recess and securing the composite minor portion and inserted segment in the countersink in the major portion of glass.

5. The process of forming a blank for bifocal or multifocal lens comprising forming a countersink in a major portion of glass of one index or refraction, forming a recess through a minor portion of glass of sensibly the same index of refraction as the major portion, securing a segment of glass of a different refractive index in the recess cutting off the edges of said minor portion of glass to properly position the segment eccentrically of the finished button and to render said minor portion substantially the size and shape of the countersink, placing, securing the composite minor portion and inserted segment in the countersink in the major portion of glass with the outline of the minor portion substantially registering with the outline of the countersink, rotating the button in the countersink to properly position the segment with respect to the major axis of the lens, securing it in place and forming a continuous curve over the major portion, minor portion and inserted segment.

6. The process of forming a bifocal or multifocal lens comprising forming a countersink curve in a major portion of glass of one refractive index, forming a tapered recess in a minor portion of glass of sensibly the same refractive index as the major portion, securing a segment of glass of a different refractive index in the recess, forming a curve of substantially the same radius as the curve of the countersink in the major portion over the minor portion and inserted segment, securing the curved side of the composite minor portion and segment in the countersink in the major portion, forming a continuous curve over the major portion, minor portion and inserted segment and forming a continuous curve over the opposite face of the major portion.

7. A composite blank for the countersink button of a fused bifocal or multifocal lens comprising a piece of glass of one index of refraction having a recess extending therethrough of the size and shape of the reading segment of the lens, and a reading segment of glass of a different index of refraction secured in said recess, the joining surface of one of said members being tapered.

8. The process of forming a blank for a countersink button for a fused bifocal or multifocal lens comprising forming a recess in a piece of glass of one index of refraction forming a second piece of glass of a different refractive index to substantially the contour shape of said recess so that it may be secured in said recess, tapering the joining surface of one of the members to be joined, and securing said second piece of glass in said recess.

9. A blank for a fused bifocal or multifocal lens comprising a major portion of glass of one index or refraction having a countersink therein and a button fused in said countersink, said button having a recess therein the contour shape of which departs from a true circle and a segment of glass of substantially the same contour shape as the recess and of a different index of refraction secured in said recess, the joining surface of one of said two last mentioned members being tapered.

10. The process of forming a blank for a fused bifocal or multifocal lens comprising forming a countersink in a major portion of glass of one index of refraction, forming a recess through a minor portion of glass of sensibly the same index of refraction as the major portion, forming a third piece of glass of different refractive index to substantially the contour shape of said recess so that it may be secured in said recess, tapering the joining surface of one of said two last mentioned pieces of glass, securing said last mentioned piece of glass in said recess, and securing the composite minor portion and inserted segment in the countersink in the major portion of glass.

11. A bifocal or multifocal lens comprising a major portion of glass of one index of refraction having a tapered countersink therein, and a segment composed of glass of a different index of refraction secured in said countersink, said lens having optical surfaces on both faces thereof.

12. A composite blank for the countersink button of a fused bifocal or multifocal lens comprising a piece of glass of one index of refraction having a recess extending therethrough of the size and shape of the reading segment of the lens, and a reading segment of glass of a different index of refraction secured in said recess, the joining surface of one of said parts being formed to prevent formation of air bubbles between the parts during the securing operation.

13. The process of forming a blank for a countersink button for a fused bifocal or multifocal lens comprising forming a recess in a piece of glass of one index of refraction, forming a second piece of glass of a different refractive index to substantially the contour shape of said recess so that it may be secured in said recess, forming the joining surface of one of said members to prevent the formation of air bubbles between the parts during the securing operation, and securing said second piece of glass in said recess.

14. A blank for a fused bifocal or multifocal lens comprising a major portion of glass of one index of refraction having a countersink therein and a button fused in said countersink, said button having a recess therein, and a segment of glass of substantially the same contour shape as the recess and of a different index of refraction secured in said recess, the joining surface of one of said two last mentioned members being formed to prevent the formation of air bubbles between the parts during the securing operation.

15. The process of forming a blank for a fused bifocal or multifocal lens comprising forming a countersink in a major portion of glass of one index of refraction, forming a recess through a minor portion of glass of sensibly the same index of refraction as the major portion, forming a third piece of glass of different refractive index to substantially the contour shape of said recess, forming the joining surface of one of said two last mentioned pieces of glass to prevent the formation of air bubbles between the parts during the securing operation, securing said last mentioned piece of glass in said recess, and securing the composite minor portion and inserted segment in the countersink in the major portion of glass.

16. A bifocal or multifocal lens comprising a major portion of glass of one index of refraction having a shouldered countersink therein and a segment having a thick edge and composed of glass of a different index of refraction secured in said countersink, one of said parts being formed where the thick edge is joined to the shouldered portion of the countersink, to prevent the formation of air bubbles between the parts during the securing operation, said composite lens having a continuous optical surface over both sides thereof.

17. The process of forming a fused bifocal or multifocal lens comprising forming a countersink curve in a major portion of glass of one index of refraction, forming a recess in a minor portion of glass of sensibly the same refractive index as the major portion, forming a third piece of glass of different refractive index to substantially the contour shape of said recess so that it may be secured in said recess, forming the joining surface of one of said two last mentioned pieces of glass to prevent the formation of air bubbles between the parts during the securing operation, securing said last mentioned piece of glass in said recess, securing the composite minor portion and inserted segment in the countersink in the major portion of glass, forming a continuous optical surface over the countersink side of said major portion, minor portion, and inserted segment and forming a continuous optical surface over the opposite side of the major portion.

18. A fused bifocal or multifocal lens comprising a major portion of glass of one index of refraction having a countersink therein and a button fused in said countersink, said button having a recess therein and a segment of glass of substantially the same contour shape as the recess, and of a different index of refraction, secured in said recess, the joining surface of one of said two last named members being formed to prevent the formation of air bubbles between the parts during the securing operation and the center of said segment being offset with respect to the center of said countersink.

HARRY W. HILL.